(12) United States Patent
Noto et al.

(10) Patent No.: US 8,900,768 B2
(45) Date of Patent: Dec. 2, 2014

(54) FUEL CELL SYSTEM, ELECTRODE CATALYST DEGRADATION JUDGMENT METHOD, AND MOVING BODY

(75) Inventors: Hironori Noto, Tokai (JP); Kota Manabe, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 690 days.

(21) Appl. No.: 12/529,102

(22) PCT Filed: Feb. 29, 2008

(86) PCT No.: PCT/JP2008/054101
§ 371 (c)(1), (2), (4) Date: Aug. 28, 2009

(87) PCT Pub. No.: WO2008/108451
PCT Pub. Date: Sep. 12, 2008

(65) Prior Publication Data
US 2010/0112401 A1    May 6, 2010

(30) Foreign Application Priority Data
Mar. 1, 2007    (JP) .................. 2007-051601

(51) Int. Cl.
*H01M 8/04*    (2006.01)

(52) U.S. Cl.
CPC ...... *H01M 8/04589* (2013.01); *H01M 2250/20* (2013.01); *H01M 8/0488* (2013.01); *H01M 8/04552* (2013.01); *Y02E 60/50* (2013.01); *H01M 8/04238* (2013.01); *H01M 8/04223* (2013.01); *H01M 8/04679* (2013.01); *H01M 8/04582* (2013.01); *H01M 8/04649* (2013.01); *Y02T 90/32* (2013.01); *H01M 8/04873* (2013.01); *H01M 8/04559* (2013.01)

USPC ............ 429/431; 429/432; 429/430; 429/445

(58) Field of Classification Search
CPC .................................. H01M 8/04537–8/04597
USPC .................................................. 429/430–432
See application file for complete search history.

(56) References Cited

U.S. PATENT DOCUMENTS

2006/0166052 A1* 7/2006 Lee et al. ................... 429/13
2006/0249399 A1* 11/2006 Uribe et al. ................. 205/705

FOREIGN PATENT DOCUMENTS

| DE | 10-2007-002-426 A1 | 11/2007 |
|----|--------------------|---------|
| JP | 2002-184414 A      | 6/2002  |

(Continued)

OTHER PUBLICATIONS

JPO machine translation of JP 2006-196452 A, retreived Jan. 25, 2012.*

(Continued)

*Primary Examiner* — Barbara Gilliam
*Assistant Examiner* — Robert S Carrico
(74) *Attorney, Agent, or Firm* — Kenyon & Kenyon LLP (57) ABSTRACT

Output voltage of a fuel cell 2 is decreased by a converter 51 to conduct an activation treatment to catalyst of the fuel cell 2, while measuring reduction current by a current sensor 2a while scanning output voltage of the fuel cell 2 over a certain range by the converter 51 as measurement of cyclic voltammetry under the condition that supply of oxidation gas to the fuel cell 2 is stopped from a compressor 31, and this measurement value is integrated by a control device 6. The control device 6 finds a charge amount of electrode catalyst of the fuel cell 2 based on this integration value, decides whether this charge amount is smaller or not than a degradation decision value, and displays this decision result on a display 55. A decision can be made precisely as to whether the electrode catalyst of the fuel cell is degraded or not.

11 Claims, 6 Drawing Sheets

(56) References Cited

FOREIGN PATENT DOCUMENTS

| | | | |
|---|---|---|---|
| JP | 2004039490 A | * | 2/2004 |
| JP | 2004-164909 A | | 6/2004 |
| JP | 2005-527943 A | | 9/2005 |
| JP | 2005-276711 A | | 10/2005 |
| JP | 2006-155921 A | | 6/2006 |
| JP | 2006-164939 A | | 6/2006 |
| JP | 2006-196452 A | | 7/2006 |
| JP | 2006-236778 A | | 9/2006 |
| WO | 2007/100811 a2 | | 9/2007 |
| WO | WO 2007136140 A1 | * | 11/2007 |

OTHER PUBLICATIONS

DE 10-2007-002-426 A1 Machine Translation, provided by EPO.*

A. Taniguchi et al.: "Analysis of electrocatalyst degradation in PEMFC caused by cell reversal during fuel starvation", Journal of Power Sources, vol. 130, No. 1-2, May 3, 2004, pp. 42-49, XP004500848.

* cited by examiner

FIG.6

FUEL CELL SYSTEM, ELECTRODE CATALYST DEGRADATION JUDGMENT METHOD, AND MOVING BODY

This is a 371 national phase application of PCT/JP2008/054101 filed 29 Feb. 2008, which claims priority to Japanese Patent Application No. 2007-051601 filed 1 Mar. 2007, the contents of which are incorporated herein by reference.

TECHNICAL FILED

The present invention relates to a degradation judgment for electrode catalyst in a fuel cell system including a fuel cell that generates electricity by an electrochemical reaction between fuel gas and oxidation gas.

BACKGROUND ART

In a fuel cell system that generates electricity using an electrochemical reaction between fuel gas (hydrogen) and oxidation gas (oxygen), conditions to control an auxiliary device that supplies hydrogen and oxygen are set so that a predetermined output can be obtained from a fuel cell, having a problem that conductivity of electrolyte and activity of electrode catalyst, for example, are degraded over time, thus leading to a failure to obtain the predetermined output from the fuel cell.

To cope with this, a device is proposed, which diagnoses a degradation state of a fuel cell based on a current/voltage characteristic and corrects conditions to control auxiliary devices based on a result of the diagnosis so that a system efficiency after degradation can be maximized (see JP-A-2004-164909).

DISCLOSURE OF THE INVENTION

According to the invention described in Patent Document 1, in order to diagnose a degradation state of a fuel cell based on a current/voltage characteristic, current/voltage characteristics (so-called I-V characteristics) before and after an increase of a hydrogen flow rate are firstly measured. Then, whether catalyst for an anode electrode is degraded or not is decided based on whether a shift component of the current/voltage characteristic after the increase of the hydrogen flow rate exceeds a predetermined value with reference to that before the increase of hydrogen flow rate. Further, current/voltage characteristics before and after an increase of an air flow rate are measured, and then whether catalyst for a cathode electrode is degraded or not is decided based on whether a shift component of the current/voltage characteristic after the increase of the air flow rate exceeds a predetermined value with reference to that before the increase of air flow rate. Such processing is not sufficient for a diagnosis as to whether the catalyst for each electrode is degraded or not. That is, when current/voltage characteristics of a fuel cell are measured while increasing air or hydrogen, air, water, or hydrogen affects electrode catalyst, so that the state of the electrode catalyst may be changed. Further, since a water-content state of electrolyte also affects the state of the electrode catalyst, there is a need to make a decision concerning degradation of electrode catalyst so as to be free from the water-content state.

Thus, in order to cope with the above-stated problems of conventional techniques, it is an object of the present invention to decide precisely whether electrode catalyst of a fuel cell is degraded or not.

In order to achieve the above-stated object, a fuel cell system of the present invention includes a fuel cell that generates electricity in response to supply of reaction gas. The fuel cell system is configured so that a degradation state of electrode catalyst of the fuel cell can be decided based on a cyclic voltammetry characteristic of output current of the fuel cell detected associated with output voltage of the fuel cell being changed while a supply amount of the reaction gas supplied to the fuel cell being made constant.

With this configuration, a degradation state of the electrode catalyst can be decided based on a Cyclic Voltammetry (CV) characteristic closely relating to an activation state of the electrode catalyst, e.g., voltammogram (a current-voltage hysteresis curve). The I-V characteristics used in conventional techniques, which are affected by a plurality of factors such as a loss incident to a cathode reaction, a loss incident to material transfer at a cathode, a loss incident to an anode reaction, and a loss incident to material transfer at an anode, are not accurate as an index to measure activity of the electrode catalyst. In this respect, the CV characteristic measured while stabilizing reaction gas, which shows a distinctive change characteristic depending on an oxidation-reduction state of the electrode catalyst and the magnitude of voltage, can be an index showing a state of the electrode catalyst accurately by referring to a value and an effective area thereof. According to the present invention, a degradation state of electrode catalyst is decided based on this CV characteristic, and therefore catalyst degradation can be decided extremely accurately.

Herein, the CV characteristic has distinctive parts whose characteristic changes depending on a state of electrode catalyst, and therefore to detect a change in characteristic of these distinctive parts enables a decision concerning degradation of electrode catalyst. For instance, an integration value obtained by integrating the CV characteristic over a certain section may be calculated or a current value of a minimum point and a maximum point may be detected, which then may be compared with allowable thresholds.

For instance, a degradation state of the electrode catalyst of the fuel cell preferably is decided based on a change in a minimum point indicated by output current of the fuel cell detected associated with a decrease of output voltage of the fuel cell. With this configuration, a change of characteristic in a distinctive part of the CV characteristic, which is the most susceptible to degradation of the electrode catalyst, can be detected.

More specifically, the present invention includes: voltage conversion means that changes output voltage of the fuel cell; voltage detection means that detects output voltage of the fuel cell; current detection means that detects output current of the fuel cell; and decision means that decides whether electrode catalyst of the fuel cell is degraded or not based on the current detected by the current detection means. The decision means calculates a value corresponding to an effective area of the electrode catalyst based on current detected by the current detection means associated with a change of output voltage of the fuel cell while monitoring voltage detected by the voltage detection means under a condition that an activation treatment is conducted to the electrode catalyst, and compares a result of the calculation with a degradation decision value to decide whether the electrode catalyst is degraded or not.

With this configuration, a value corresponding to an effective area of the electrode catalyst is calculated based on current detected associated with a change of output voltage of the fuel cell while monitoring output voltage of the fuel cell under a condition that an activation treatment is conducted to the electrode catalyst. A value corresponding to the effective area of the electrode catalyst is compared with a degradation decision value to decide whether the electrode catalyst is degraded or not. It can be decided that the electrode catalyst is degraded if the value corresponding to the effective area of the electrode catalyst is smaller than the degradation decision value.

In this way, measurement of cyclic voltammetry (CV) is conducted so as to measure current while scanning applied voltage to the fuel cell repeatedly within a certain range under the condition where the electrode catalyst is activated, whereby a value corresponding to an effective area of the electrode catalyst associated with degradation of the electrode catalyst can be detected precisely, thus resulting in a precise decision whether the electrode catalyst is degraded or not.

The configuration of the fuel cell system may include the following elements added thereto.

Preferably, the voltage conversion means changes output voltage of the fuel cell under a condition that the current detection means detects oxidation current as output current of the fuel cell.

With this configuration, the measurement of cyclic voltammetry (CV) under the condition that oxidation current flows through the fuel cell leads to a reaction of $Pt.H \rightarrow H^+ + e^-$ within a predetermined voltage range when Pt is used as electrode catalyst, and therefore when current obtained at this time is integrated, the electric quantity Q[C] associated with hydrogen desorption can be found, thus enabling a decision as to whether the electrode catalyst is degraded or not based on the electric quantity Q[C] associated with hydrogen desorption.

Preferably, the voltage conversion means changes output voltage of the fuel cell under a condition that the current detection means detects reduction current as output current of the fuel cell.

With this configuration, the measurement of cyclic voltammetry (CV) under the condition that reduction current flows through the fuel cell leads to a reaction of $Pt.OH + 2H^+ + 2e^- \rightarrow Pt + H_2O$ as a reaction of $OH^-$ desorption within a predetermined voltage range, and therefore when current obtained at this time is integrated, the electric quantity Q[C] associated with water desorption can be found, thus enabling a precise decision as to whether the electrode catalyst is degraded or not based on the electric quantity Q[C] associated with water desorption.

Preferably, the voltage detection means includes a cell voltage monitor that detects voltage of each cell of a cell group making up the fuel cell, and the decision means calculates an effective area of electrode catalyst corresponding to each cell based on current of the fuel cell while monitoring voltage detected by the cell voltage monitor, and decides whether the electrode catalyst corresponding to each cell is degraded or not based on a value of the calculation.

With this configuration, an effective area of catalyst corresponding to each cell is calculated based on current of the fuel cell while monitoring voltage of each cell using the cell voltage monitor, and whether the electrode catalyst corresponding to each cell is degraded or not can be decided based on each calculated value.

BEST MODE FOR CARRYING OUT THE INVENTION

The following describes a fuel cell system according to embodiments of the present invention with reference to the drawings.

Embodiment 1

The present embodiment describes an example where the present invention is adapted to a vehicle-mounted electric-power generation system for a fuel cell hybrid vehicle.

Figure 1:
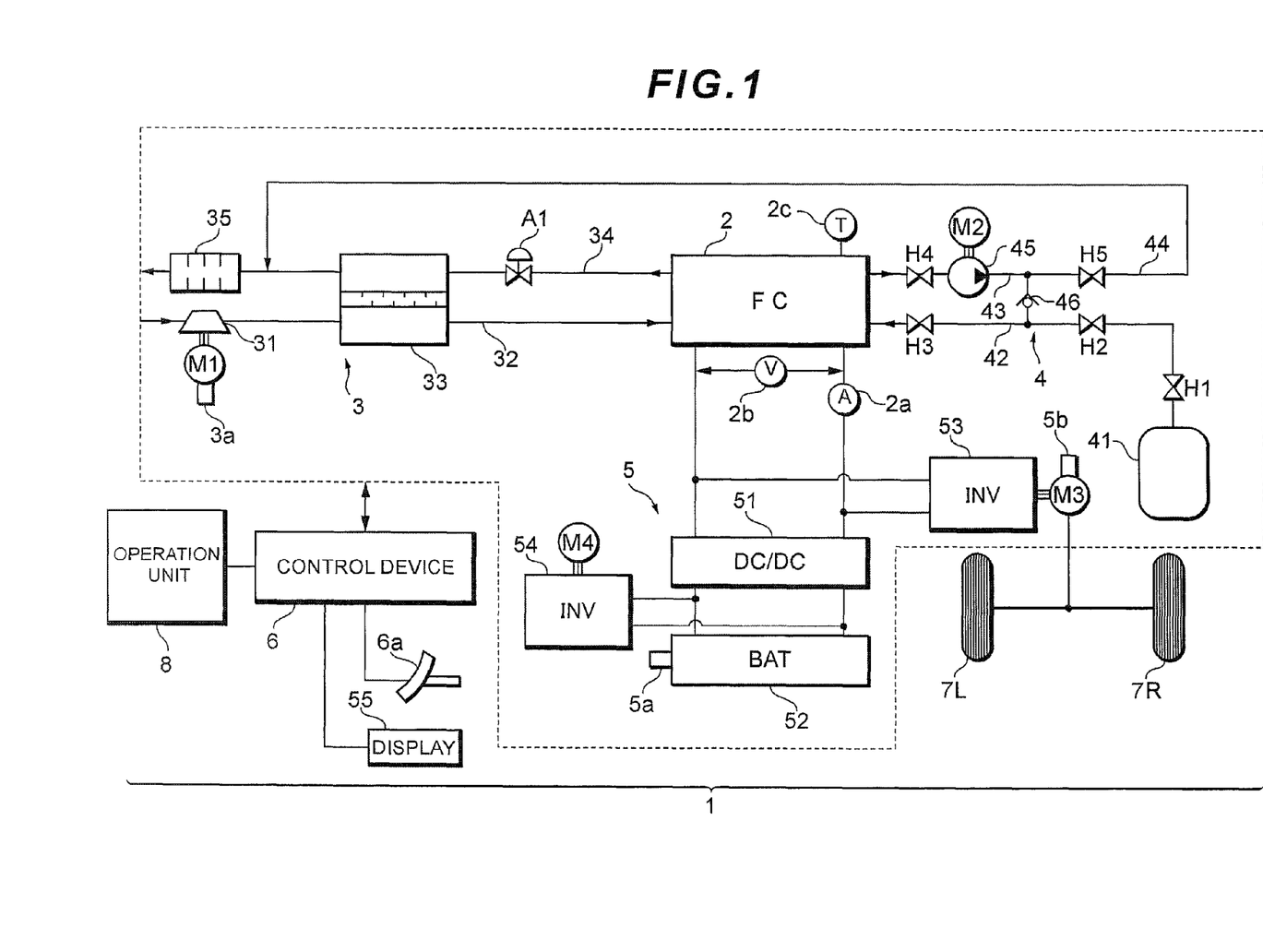
FIG. 1 illustrates the system configuration of a fuel cell system showing one embodiment of the present invention.

Referring now to FIG. 1, the configuration of a fuel cell system 1 according to the present embodiment will be described below.

As illustrated in FIG. 1, the fuel cell system 1 of the present embodiment includes a fuel cell 2 that generates electricity in response to supply of reaction gas (oxidation gas and fuel gas) and generates electric power from the electricity generation, an oxidation gas piping system 3 that supplies air as the oxidation gas to the fuel cell 2, a fuel gas piping system 4 that supplies hydrogen gas as the fuel gas to the fuel cell 2, an electric-power system 5 that charges and discharges electric power of the system, a control device 6 that controls the system as a whole, and the like.

The fuel cell 2, for example, is configured as a solid polymer electrolyte type, and includes a stack configuration in which a large number of cells are laminated. A cell of the fuel cell 2 includes a cathode (air electrode) on one surface of electrolyte made up of ion exchange membrane, and includes an anode (fuel electrode) on the other surface, where an electrode including the cathode and the anode uses a porous carbon material as a base and platinum Pt as catalyst (electrode catalyst), for example. A pair of separators is further included so as to sandwich the cathode and the anode from both sides. Then, fuel gas is supplied to a fuel gas passage on one of the separators and oxidation gas is supplied to an oxidation gas passage on the other separator, and this gas supply allows the fuel cell 2 to generate electric power. The fuel cell 2 includes a current sensor (current detection means) 2a that detects current (output current) during electricity generation, a voltage sensor (voltage detection means) 2b that detects voltage (output voltage), and a temperature sensor (temperature detection means) 2c that detects a temperature of the fuel cell 2 attached thereto.

Note here that various types of fuel cells 2 such as a phosphate-type and a molten carbonate-type and the like can be adopted in addition to the solid polymer electrolyte type.

The oxidation gas piping system 3 includes an air compressor 31, an oxidation gas supply path 32, a humidification module 33, a cathode off-gas flow path 34, a dilution device 35, a motor M1 that drives the air compressor 31, and the like.

The air compressor 31 is driven by a driving force of the motor M1 that operates in response to a control instruction from the control device 6, and supplies air (oxidation gas)

taken in from outside air to the cathode of the fuel cell 2 via a not-illustrated air filter. The motor M1 includes a rotation speed detection sensor 3a attached thereto, which detects a rotation speed of the motor M1. The oxidation gas supply path 32 is a gas flow path that leads oxygen supplied from the air compressor 31 to the cathode of the fuel cell 2. The cathode of the fuel cell 2 discharges cathode off-gas via the cathode off-gas flow path 34. The cathode off-gas contains pumping hydrogen generated on the cathode side in addition to oxygen off-gas subjected to a cell reaction of the fuel cell 2. This cathode off-gas, which contains water generated by the cell reaction of the fuel cell 2, is in a high moist state.

The humidification module 33 exchanges water between oxidation gas in a low moist state flowing through the oxidation gas supply path 32 and cathode off-gas in a high moist state flowing through the cathode off-gas flow path 34, thus humidifying oxidation gas supplied to the fuel cell 2 appropriately. The cathode off-gas flow path 34 is a gas flow path to discharge cathode off-gas outside of the system, and includes an air regulator valve A1 in the vicinity of the cathode exit thereof. A back pressure of oxidation gas supplied to the fuel cell 2 is adjusted by the air regulator valve A1. The dilution device 35 dilutes a concentration of hydrogen gas discharged so as to be within a predetermined concentration range (e.g., a range determined based on environmental criteria). The dilution device 35 is in communication with the downstream of the cathode off-gas flow path 34 and the downstream of an anode off-gas flow path 44 described later, and mixes and dilutes hydrogen off-gas and oxygen off-gas to discharge the same outside of the system.

The fuel gas piping system 4 includes a fuel gas supply source 41, a fuel gas supply path 42, a fuel gas circulation path 43, the anode off-gas flow path 44, a hydrogen circulating pump 45, a check valve 46, a motor M2 that drives the hydrogen circulating pump 45, and the like.

The fuel gas supply source 41 is fuel gas supply means that supplies fuel gas such as hydrogen gas to the fuel cell 2, and includes a high-pressure hydrogen tank, a hydrogen storage tank, and the like. The fuel gas supply path 42 is a gas flow path that leads fuel gas discharged from the fuel gas supply source 41 to the anode of the fuel cell 2, and includes valves disposed thereto such as a tank valve H1, a hydrogen supply valve H2, and a FC entrance valve H3 from the upstream to the downstream thereof. The tank valve H1, the hydrogen supply valve H2, and the FC entrance valve H3 are shut valves that supply (or shut off) fuel gas to the fuel cell 2, and includes a solenoid valve, for example.

The fuel gas circulation path 43 is a feedback gas flow path that causes non-reacted fuel gas to be returned to the fuel cell 2, and includes a FC exit valve H4, the hydrogen circulating pump 45, and the check valve 46 disposed thereto from the upstream to the downstream. Non-reacted fuel gas at a low pressure discharged from the fuel cell 2 is pressurized appropriately by the hydrogen circulating pump 45 driven by a driving force of the motor M2 that operates in response to a control instruction from the control device 6, and is lead to the fuel gas supply path 42. Backward flow of fuel gas from the fuel gas supply path 42 to the fuel gas circulation path 43 can be suppressed by the check valve 46. The anode off-gas flow path 44 is a gas flow path to discharge anode off-gas containing hydrogen off-gas discharged from the fuel cell 2 outside of the system, and includes a purge valve H5 disposed thereto.

The electric-power system 5 includes a high-voltage DC/DC converter 51, a battery 52, a traction inverter 53, an auxiliary device inverter 54, a traction motor M3, an auxiliary device motor M4, and the like.

The high-voltage DC/DC converter (voltage conversion means) 51 is a DC voltage converter, and is configured as the voltage conversion means having a function of adjusting DC voltage input from the battery 52 and outputting the same to the traction inverter 53 side, and a function of adjusting DC voltage input from the fuel cell 2 or the traction motor M3 and outputting the same to the battery 52. These functions of the high-voltage DC/DC converter 51 can implement charge and discharge of the battery 52. The high-voltage DC/DC converter 51 further controls output voltage of the fuel cell 2.

The battery 52 is a chargeable and dischargeable electric storage device, and can be made up of various types of secondary batteries such as a nickel-hydride battery. The battery 52 can charge surplus electric power or supply electric power supplementarily under the control of a battery computer not illustrated. A part of DC electric power generated by the fuel cell 2 is stepped up and down by the high-voltage DC/DC converter 51, which is used to discharge the battery 52. The battery 52 includes a SOC (State Of Charge) sensor 5a attached thereto, which detects a SOC of the battery 52. Note here that, instated of the battery 52, a chargeable and dischargeable electric storage device other than secondary batteries can be adopted, including a capacitor, for example.

The traction inverter 53 and the auxiliary device inverter 54 are PWM inverters of a pulse width modulation type, for example, which convert DC electric power output from the fuel cell 2 or the battery 52 to three-phase AC electric power in accordance with a control instruction given, and supply the same to the traction motor M3 and the auxiliary device motor 4. The traction motor M3 is a motor (vehicle driving motor) that drives wheels 7L and 7R, which is one embodiment of a load power source. The traction motor M3 includes a rotation speed detection sensor 5b attached thereto, which detects a rotation speed of the motor. The auxiliary device motor M4 is a motor to drive various auxiliary devices, which is a generic name for the M1 that drives the air compressor 31, the motor M2 that drives the hydrogen circulating pump 45, and the like.

The control device 6 includes a CPU, a ROM, a RAM, and the like, which controls various parts of the system in accordance with sensor signals input. More specifically, the control device 6 calculates a required output electric power for the fuel cell 2 in accordance with sensor signals sent from an gas pedal sensor 6a that detects an gas pedal turn, the SOC sensor 5a, the rotation speed detection sensors 3a and 5b, and the like. At this time, the control device 6 decides the presence or not of an output request from the traction motor M3 in accordance with a signal sent from an operation unit 8 including a shift lever and the like that enable selection of a driving mode (P: parking mode, R: reverse mode, N: neutral mode6, D: drive mode, B: regenerating brake mode) of the traction motor M3.

Then, the control device 6 controls output voltage and output current of the fuel cell 2 so as to generate output electric power corresponding to this required output electric power. The control device 6 further controls output pulses of the traction inverter 53 and the auxiliary device inverter 54 to control the traction motor M3 and the auxiliary device motor M4. Based on these control conditions, the control device 6 makes a display 55 show appropriate display.

Herein, when oxygen is adsorbed to a catalyst layer of the fuel cell 2, output voltage of the fuel cell 2 is lowered. Thus, the control device 6 stops the supply of oxygen to the fuel cell 2 temporarily and lowers voltage generated from the fuel cell 2 to a reduction region of the catalyst layer so as to conduct a reduction treatment or a refresh treatment for activation of the catalyst layer.

When the electrode catalyst of the fuel cell 2 is degraded until the activity of catalyst is lowered over time, then a predetermined electric power cannot be obtained from the fuel cell 2, and therefore the control device 6 further decides whether the electrode catalyst of the fuel cell 2 is degraded or not in the course of the refresh treatment. The present invention relates to this degradation judgment of the electrode catalyst.

(Descriptions of Principle)

The following describes principle of the present invention.

Figure 2:
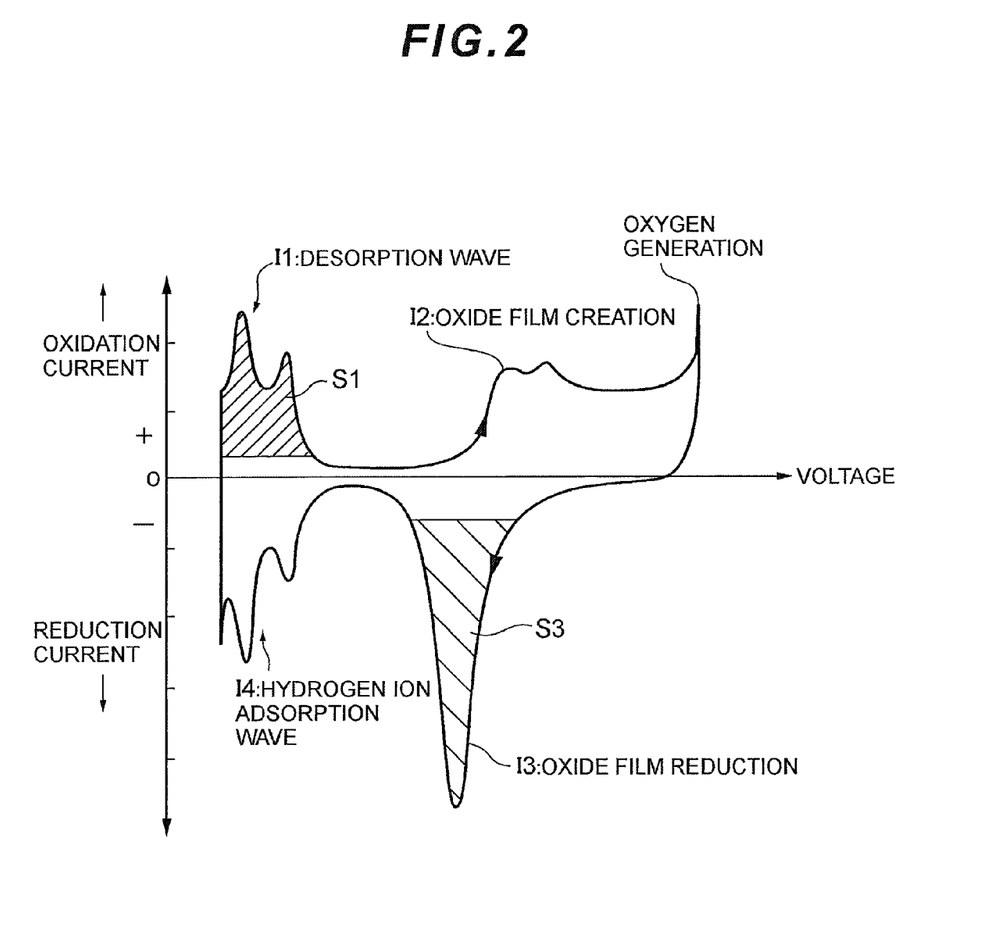
FIG. 2 illustrates a current-electrical potential curve (voltammogram) showing relationships between oxidation current and voltage and between reduction current and voltage by cyclic voltammetry.

As illustrated in FIG. 2, when electrode catalyst of the fuel cell 2 is in an activated state, measurement of cyclic voltammetry (CV) conducted while changing the output voltage of fuel cell 2 in the cycle of low voltage→high voltage→low voltage using the high-voltage DC/DC converter (voltage conversion means) 51 will result in voltammogram as illustrated. This voltammogram shows several distinctive parts depending on a difference of a reaction generated in accordance with a sweep voltage. The present invention decides whether electrode catalyst is degraded or not based on these characteristic parts.

That is, when voltage is increased from low voltage, oxidation current flows through the fuel cell 2. The voltammogram of FIG. 2, for example, shows a change as in characteristic I1 or characteristic I2. Herein, the state where oxidation current flows means that electrode catalyst of the fuel cell 2 is in an oxidation region. For instance, within a predetermined voltage range (voltage sweep range), when Pt is used as electrode catalyst, $Pt.H \rightarrow H^+ + e^-$ occurs as a reaction of H+ desorption, as illustrated in the characteristic I1 (oxidation current I1) of FIG. 2. The waveform of the voltammogram at this time is referred to as a desorption wave. When the range of voltage sweep is further increased, $Pt + H_2O \rightarrow Pt.OH + 2H^+ + 2e^-$ occurs as a reaction by the electrolysis of water as illustrated in the characteristic I2 (oxidation current I2). That is, an oxide film is formed at the electrode.

When voltage is decreased from this state, reduction current flows through the fuel cell 2, so that the voltammogram of FIG. 2 shows a change as in characteristic I3 and characteristic I4. The state where reduction current flows means that electrode catalyst of the fuel cell 2 is in a reduction region. For instance, when voltage is changed over a predetermined range under the condition where the output current of the fuel cell 2 indicates reduction current, $Pt.OH + 2H^+ + 2e^- \rightarrow Pt + H_2O$ occurs as a reaction of water desorption as illustrated in the characteristic I3 (reduction current I3), and when voltage is further decreased, $Pt + H^+ + e^- \rightarrow Pt.H$ occurs as a reaction of hydrogen ions adsorbed by Pt as illustrated in the characteristic I4 (reduction current I4).

When the measurement of cyclic voltammetry (CV) is conducted to obtain voltammogram and current is integrated within the range of the oxidation current I1, for example, then electric quantity Q[C] associated with desorption of hydrogen can be obtained based on a time and a current value per unit area. Meanwhile, when current is integrated within the range of the reduction current I3, then electric quantity Q[C] associated with desorption of water can be obtained based on a time and a current value per unit area. Comparison between these calculation results and a predetermined degradation decision value leads to decision whether the electrode catalyst is degraded or not. Since an effective area of the electrode catalyst is decreased as the electrode catalyst is degraded, it can be decided that the electrode catalyst is degraded when the charge amount Q is smaller than the degradation decision value.

In other words, measurement of cyclic voltammetry (CV) is conducted so as to measure current while scanning applied voltage to the fuel cell 2 repeatedly within a certain range under the condition where the electrode catalyst is activated, whereby an effective area of the electrode catalyst associated with degradation of the electrode catalyst can be detected precisely, thus resulting in precise decision whether the electrode catalyst is degraded or not.

Figure 6:
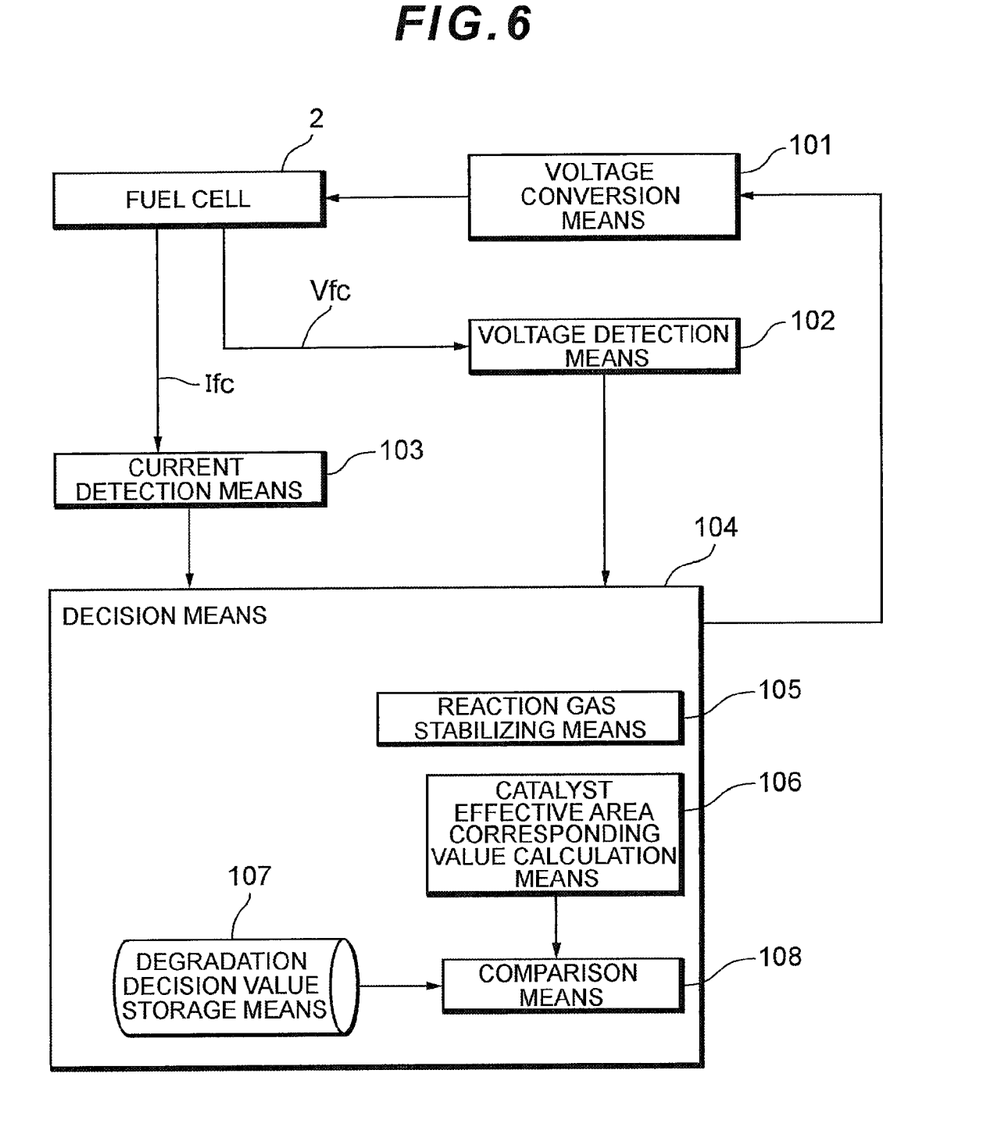
FIG. 6 is a functional block diagram in the present embodiment.

FIG. 6 is a functional diagram to implement the decision concerning degradation of electrode catalyst in accordance with the above-stated principle.

As illustrated in FIG. 6, a cell fuel system 100 of the present invention includes voltage conversion means 101, voltage detection means 102, current detection means 103, and decision means 104.

The voltage conversion means 101 is a functional block that changes output voltage of the fuel cell 2, to which the DC/DC converter 51 controlled by the control device 6 corresponds in the present embodiment.

The voltage detection means 102 is a functional block detecting output voltage Vfc of the fuel cell 2, to which the voltage sensor 2b and the control device 6 finding the output voltage of the fuel cell based on a detection signal from the voltage sensor 2b correspond in the present embodiment.

The current detection means 103 is a functional block detecting output current Ifc of the fuel cell 2, to which the current sensor 2a and the control device 6 finding the output current of the fuel cell based on a detection signal from the current sensor 2a correspond in the present embodiment.

The decision means 104 is a functional block deciding whether the electrode catalyst of the fuel cell 2 is degraded or not based on current detected by the current detection means 103, to which the control device 6 corresponds. The decision means 104 further includes reaction gas stabilizing means 105, catalyst effective area corresponding value calculation means 106, degradation decision value storage means 107, and comparison means 108.

The reaction gas stabilizing means 105 stabilizes a supply amount of reaction gas supplied to the fuel cell 2. The catalyst effective area corresponding value calculation means 106 calculates a value corresponding to an effective area of the electrode catalyst based on the output current Ifc of the fuel cell 2 detected by the current detection means 103. The degradation decision value storage means 107 stores a degradation decision value that is a threshold to decide whether the electrode catalyst is degraded or not based on a comparison with a value corresponding to the effective area of the electrode catalyst. The comparison means 108 compares a calculation result of the value corresponding to the effective area of the electrode catalyst with the degradation decision value stored in the degradation decision value storage means 107 so as to decide whether the electrode catalyst is degraded or not.

Herein, "the value corresponding to the effective area of the electrode catalyst" is not limited as long as the value is physical quantity relatively indicating an area capable of generating electricity where electrode catalyst is activated. For instance, a preferable value corresponding to an effective area of the electrode catalyst may include a charge amount of the electrode. Therefore, the present embodiment is configured so that in the course of a change of output voltage from the fuel cell, output current from the fuel cell is integrated, and electric quantity Q[C] associated with hydrogen desorption is calculated based on a time and a current value, and this calculation result and the degradation decision value are compared to decide whether the electrode catalyst is degraded or not. With this configuration, the charge amount Q of the electrode catalyst is made smaller as the electrode catalyst is degraded, and therefore it can be decided that the electrode catalyst is degraded if the charge amount Q is smaller than the degradation decision value. In the present embodiment, degradation decision for electrode catalyst is conducted based on a charge amount of the electrode catalyst.

(Descriptions of Operation)

Figure 3:
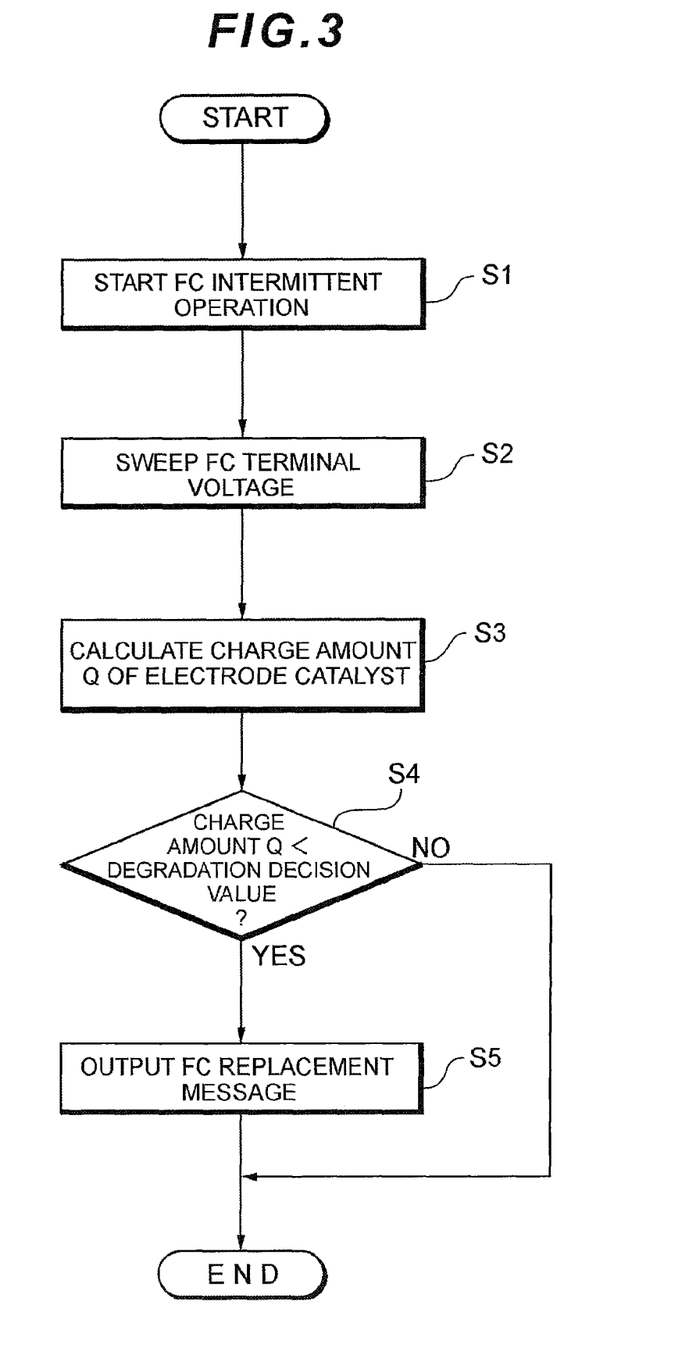
FIG. 3 is a flowchart to explain the processing of deciding whether electrode catalyst of a fuel cell is degraded or not when the fuel cell operates intermittently in Embodiment 1.

Following a flowchart of FIG. 3, the processing of deciding whether the electrode catalyst of the fuel cell 2 is degraded or not during intermittent operation will be described below.

The intermittent operation of a fuel cell refers to an operation mode where electric power from the fuel cell is suppressed temporally in response to a request from the system when a vehicle mounting the fuel cell runs stably so that it can run only by the electricity supply from a battery. During the intermittent operation, the supply of oxidation gas and fuel gas to the fuel cell 2 can be stopped or be changed. The refresh treatment to activate the electrode catalyst uses the time for this intermittent operation, where the supply of oxidation gas is temporally stopped to allow the fuel cell 2 to operate in a reduction region so as to activate the electrode catalyst.

When the supply of oxidation gas is stopped for the refresh treatment, the output voltage of the fuel cell decreases. The fuel cell 2 will be operated passing through the regions of the characteristic I3 and the characteristic I4 of voltammogram of FIG. 2. To detect the output current at this time means the measurement of a voltammetry characteristic. Therefore, a degradation state of the electrode catalyst can be decided by monitoring the characteristic parts corresponding to the characteristic I3 and the characteristic I4.

Firstly, as illustrated in Step S1, the control device 6 starts an intermittent operation as a refresh operation involving a refresh treatment (reduction treatment) similarly to the case without an output request. For instance, the control device 6 stops the driving of the motor M1 of the air compressor 31, stops the supply of oxidation gas (air) supplied from the air compressor 31 to the fuel cell 2 via the humidification module 33, and controls conversion output of the high-voltage DC/DC converter 51 while monitoring the output voltage of the voltage sensor 2b, so as to decrease the output voltage (overall voltage) of the fuel cell 2 to a voltage to activate the electrode catalyst of the fuel cell 2.

Since the secondary side of the high-voltage DC/DC converter 51 is connected in parallel with an output terminal of the fuel cell 2, electric power conversion processing to decrease the voltage on the secondary side relative to the high-voltage DC/DC converter 51 forcibly limits the voltage generated from the fuel cell 2 to the secondary-side voltage of the converter 51 even when the generated voltage is higher than the secondary voltage of the converter 51, and correspondingly the current value increases in accordance with the I-V characteristic. That is, the upper limit of the voltage generated from the fuel cell 2 is limited by the secondary voltage of the converter 51. By controlling the high-voltage DC/DC converter 51, the output voltage (overall voltage) of the fuel cell 2 can be lowered to a voltage enabling activation of the electrode catalyst of the fuel cell 2.

Next, at Step S2, the control device 6 executes control with respect to the high-voltage DC/DC converter 51 so as to scan (voltage sweep) the output voltage (overall voltage) of the fuel cell 2 over a certain range under the condition of dV/dt=constant, when an activation treatment is conducted to the electrode catalyst of the fuel cell 2. For instance, the control device 6 successively controls conversion output to the high-voltage DC/DC converter 51 so that the characteristic I3 (reduction current I3) of FIG. 2 can be obtained as the measurement of the cyclic voltammetry (CV). When the output voltage (overall voltage) of the fuel cell 2 changes over a certain range, output current changes in accordance with the change of the output voltage of the fuel cell 2. At this time, the current detected by the current sensor 2a is the reduction current I3.

Subsequently, at Step S3, the control device 6 integrates this reduction current I3, and calculates electric quantity Q[C] associated with water desorption based on a time and a current value per unit area.

Next, at Step S4, the control device 6 compares the calculated charge amount Q with the degradation decision value. Then, at Step S5, if the calculated charge amount Q is larger than the degradation decision value (NO), it is judged that the electrode catalyst is in a normal state, thus finishing the processing in this routine. On the other hand, if the calculated charge amount Q is smaller than the degradation decision value (YES), it is judged that the electrode catalyst is degraded, thus displaying a message urging replacement of the fuel cell 2 on a meter, an instrument panel, or the display 55 in a multi-information device (MID). Thus, a user or an operator is informed that the fuel cell 2 is at a time to be replaced, thus finishing the processing in this routine.

As stated above, according to Embodiment 1, during the intermittent operation of the fuel cell 2, the measurement of cyclic voltammetry (CV) is conducted while conducting a refresh treatment for the electrode catalyst, followed by the integration of reduction current I3, and the charge amount Q of the electrode catalyst is found based on the integrated value, and a decision is made whether this charge amount Q is smaller or not than the degradation decision value. Therefore, even when the fuel cell 2 is mounted in a vehicle, it can be decided precisely as to whether the electrode catalyst of the fuel cell 2 is degraded or not.

Further, in Embodiment 1, a decision as to whether the electrode catalyst of the fuel cell 2 is degraded or not is made in a state where the supply of the oxygen (oxidation gas) to the fuel cell 2 is shut off whereas hydrogen (fuel gas) being supplied, and therefore it can be decided precisely as to whether the electrode catalyst is degraded or not in a state where the electric generation by the fuel cell 2 is stopped and without giving a damage on the electrolyte of the fuel cell 2.

Further, Embodiment 1 describes the case where the cyclic voltammetry (CV) is measured under the condition of the reduction current I3 flowing so as to decide whether the electrode catalyst is degraded or not. The cyclic voltammetry (CV), however, may be measured under the condition of the oxidation current I1 (characteristic I1 of FIG. 2) flowing. That is, the oxidation current I1 is integrated, a charge amount Q is found based on this integrated value, and a comparison is made between this charge amount Q and the degradation decision value so as to decide whether the electrode catalyst of the fuel cell 2 is degraded or not. Moreover, other physical quantities corresponding to the charge amount Q may be used as a decision target.

Further, Embodiment 1 allows a precise decision as to whether the electrode catalyst of the fuel cell 2 is degraded or not even when the fuel cell 2 is mounted in a vehicle, thus allowing an operator such as a dealer to check whether the electrode catalyst of the fuel cell 2 is degraded or not during examination of the fuel cell 2 mounted in the vehicle, whereby they can expect the time when a stack has to be replaced or can prepare for a stack for the replacement.

Note here that in the above-stated Embodiment 1 the decision concerning the degradation of electrode catalyst of a fuel cell is conducted based on the cyclic voltammetry characteristic. However, it can be said that a relative amount of the charge amount obtained by integrating the current value of the cyclic voltammetry characteristic corresponds to the amount of an oxide film attached to the electrode catalyst (a smaller charge amount means a larger amount of the oxide film attached to the electrode catalyst). Therefore, as possible control, whether or not to conduct an activation treatment of the electrode catalyst can be decided based on whether the amount of this oxide film is larger or not than a predetermined threshold, or a duration of the catalyst activation treatment can be adjusted based on the amount of the oxide film.

Embodiment 2

The above-stated Embodiment 1 describes the method of decreasing output voltage (overall voltage) of the fuel cell 2 for the measurement of the cyclic voltammetry (CV) to control the overall voltage over a predetermined range variably, thus detecting current in response to a change in the overall voltage. However, the measurement of cyclic voltammetry may be conducted based on detection voltage for each cell.

Figure 4:
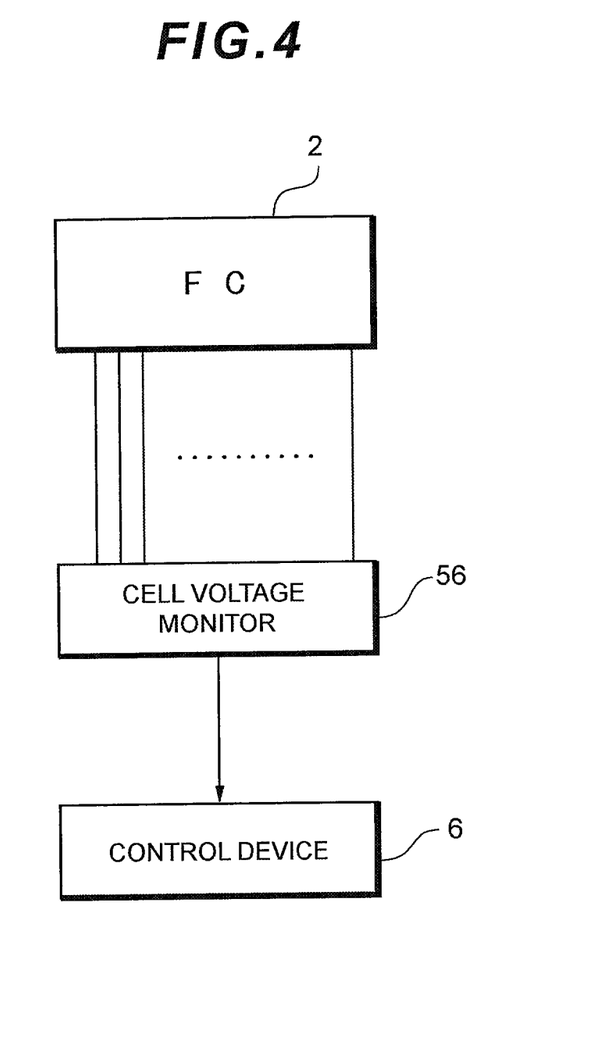
FIG. 4 illustrates the configuration of a cell voltage monitor and a current monitor in Embodiment 2.

FIG. 4 illustrates a cell voltage monitor to implement Embodiment 2.

As illustrated in FIG. 4, Embodiment 2 is provided with a cell voltage monitor 56 that detects voltage of each cell included in a cell group making up the fuel cell 2, instead of the voltage sensor 2b.

Embodiment 2 operates for the measurement of cyclic voltammetry (CV) to detect output current of the fuel cell associated with a change in voltage of each cell by the above-stated current sensor 2a, for example, while monitoring the voltage of each cell detected by the cell voltage monitor 56.

More specifically, in the course where output voltage of the fuel cell 2 is decreased in accordance with electric power conversion processing of the converter 51 and controls the output voltage of the fuel cell 2 within a certain range variably, a controller 6 integrates output current, e.g., reduction current I3, of the fuel cell, while monitoring voltage detected by the cell voltage monitor 56. Then, based on the calculated each integrated value, a decision is made whether electrode catalyst corresponding to each cell is degraded or not.

Embodiment 2 enables a precise decision as to whether electrode catalyst corresponding to each cell is degraded or not.

Embodiment 3

In the above-stated Embodiment 1, an effective area is found by integration for a distinctive part of voltammogram obtained by the measurement of cyclic voltammetry (CV), which is then compared with a degradation decision value. On the other hand, in Embodiment 3, a decision is made based on an absolute value of output current as to whether electrode catalyst is degraded or not.

Figure 5:
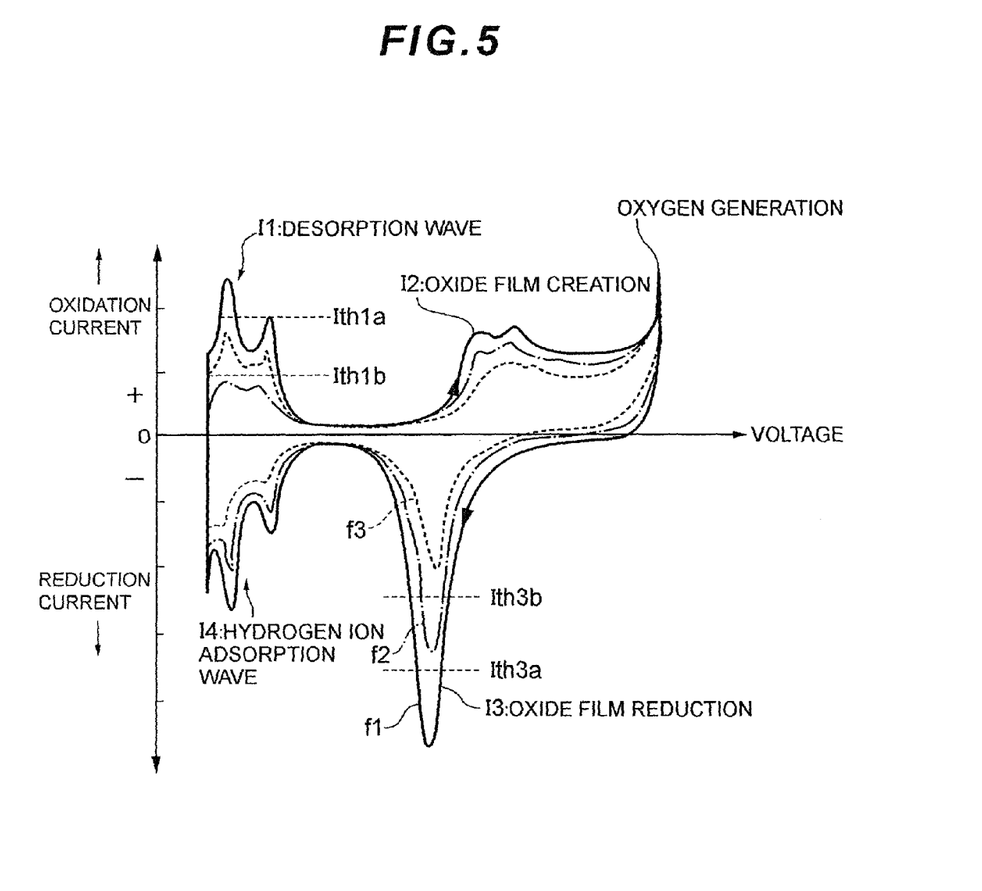
FIG. 5 illustrates a current-electrical potential curve (voltammogram) in Embodiment 3 showing relationships between oxidation current and voltage and between reduction current and voltage by cyclic voltammetry.

FIG. 5 illustrates a current-electrical potential curve (voltammogram) corresponding to the degree of oxidation of electrode catalyst.

As is evident from FIG. 5, it can be understood that absolute values of output current in characteristic I3 and characteristic I1 also greatly change as electrode catalyst is degraded. Thus, in Embodiment 3 an absolute value of output current is compared with a degradation decision value, so as to decide whether the electrode catalyst is degraded or not. To this end, the degradation decision value is set beforehand so as to decide whether the electrode catalyst is degraded or not, based on a change of the voltammogram associated with degradation of the electrode catalyst.

For instance, as illustrated in FIG. 5, voltammogram f1 in the state where electrode catalyst is activated has a minimum value in characteristic I3 and a maximum value in characteristic I1 changing greatly as compared with voltammogram f2 where oxidation of the electrode catalyst progresses in some degree and with voltammogram f3 where the oxidation progresses relatively. Therefore, in the region of characteristic I3, output current detected by the current sensor 2a is compared with a degradation decision value Ith3a, whereby an electrode degradation state in the degree of voltammogram f2 can be decided, and the output current is compared with a degradation decision value Ith3b, whereby an electrode degradation state progressing to the degree of voltammogram f3 can be decided. In the region of characteristic I1, output current detected by the current sensor 2a is compared with a degradation decision value Ith1a, whereby an electrode degradation state in the degree of voltammogram f2 can be decided, and the output current is compared with a degradation decision value Ith1b, whereby an electrode degradation state progressing to the degree of voltammogram f3 can be decided.

Therefore, based on voltammogram corresponding to the allowable limit of the electrode catalyst degradation, a threshold may be set as a degradation decision value so as to detect the degradation of the electrode catalyst progressing beyond the limit, whereby a decision can be made based on an absolute value of output current as to whether the electrode catalyst is degraded or not. In the example of FIG. 5, if the degradation of the electrode catalyst in the degree of voltammogram f2 is to be detected, the degradation decision values Ith1a and Ith3a may be used. If the degradation of the electrode catalyst progressing to the degree of voltammogram f3 is to be detected, the degradation decision values Ith1b and Ith3b may be used.

Note here that degradation of electrode catalyst may be decided using a plurality of degradation decision values. As a possible configuration, for instance, the degradation of the electrode catalyst may be decided only when both of the decision results based on the degradation decision value in the characteristic I1 and the degradation decision vale in the characteristic I3 indicate the degradation of the electrode catalyst. A plurality of degradation decision results enables more precise decision for the degradation of the electrode catalyst.

As stated above, according to Embodiment 3, a degradation decision value is set appropriately based on measurement of voltammogram, whereby degradation of electrode catalyst can be decided properly based on an output current value of a fuel cell.

INDUSTRIAL APPLICABILITY

According to the present invention, a cyclic voltammetry characteristic is detected, which directly indicates a state of electrode catalyst of a fuel cell, and therefore whether the electrode catalyst of the fuel cell is degraded or not can be decided precisely.

Note here that a fuel cell system of the present invention is applicable to a fixed type fuel cell as well as being suitable for a power source of a moving body. This is because a moving body typically operates to warm up an engine at the starting time or in a relatively low-temperature state, and a low-efficiency operation is conducted in the case where the power source is a fuel cell, and therefore the present invention is applicable at the time of the low-efficiency operation. A moving body includes land mobile means such as a four-wheeled vehicle or a two-wheeled vehicle, aeronautical moving means such as an airplane, a helicopter, or a spaceship, or maritime or submarine moving means such as a ship or a submarine.

The invention claimed is:

1. A fuel cell system comprising a fuel cell that generates electricity in response to supply of reaction gas, the fuel cell system comprising:
   a fuel cell comprising electrode catalyst;
   a voltage conversion device that changes output voltage of the fuel cell;
   a voltage detection device that detects output voltage of the fuel cell;
   a current detection device that detects output current of the fuel cell; and
   a decision device which is programmed to determine whether the electrode catalyst of the fuel cell is degraded or not,
   wherein during an activation treatment on the electrode catalyst the decision device is programmed to
   (a) temporarily stop supplying oxidation gas;
   (b) make a supply amount of the reaction gas constant;
   (c) change output voltage of the fuel cell while monitoring voltage detected by the voltage detection device;
   (d) detect a cyclic voltammetry characteristic of output current of the fuel cell detected by the current detection device, the output current changing associated with change of output voltage of the fuel cell;
   (e) calculate a value corresponding to an effective area of the electrode catalyst based on the detected cyclic voltammetry characteristic; and
   (f) compare the calculated value with a degradation decision value to decide whether the electrode catalyst is degraded or not.

2. The fuel cell system according to claim 1, wherein the voltage conversion device is programmed to change output voltage of the fuel cell under a condition that the current detection device detects oxidation current as output current of the fuel cell.

3. The fuel cell system according to claim 2,
   wherein the voltage detection device comprises a cell voltage monitor that detects voltage of each cell of a cell group making up the fuel cell, and
   the decision device is programmed to calculate an effective area of electrode catalyst corresponding to each cell based on output current of the fuel cell while monitoring voltage detected by the cell voltage monitor, and is programmed to decide whether the electrode catalyst corresponding to each cell is degraded or not based on a value of the calculation.

4. The fuel cell system according to claim 1, wherein the voltage conversion device is programmed to change output voltage of the fuel cell under a condition that the current detection device detects reduction current as output current of the fuel cell.

5. The fuel cell system according to claim 1,
   wherein the voltage detection device comprises a cell voltage monitor that detects voltage of each cell of a cell group making up the fuel cell, and
   the decision device is programmed to calculate an effective area of electrode catalyst corresponding to each cell based on output current of the fuel cell while monitoring voltage detected by the cell voltage monitor, and decides whether the electrode catalyst corresponding to each cell is degraded or not based on a value of the calculation.

6. A moving body mounting the fuel cell system according to claim 1.

7. The fuel cell system according to claim 1, wherein an amount of oxide film at the electrode catalyst of the fuel cell is detected based on the cyclic voltammetry characteristic of output current of the fuel cell, and performance or not of an activation treatment for the electrode catalyst is decided based on the detected amount of oxide film.

8. A fuel cell system comprising a fuel cell that generates electricity in response to supply of reaction gas, the fuel cell system comprising:
   a fuel cell comprising electrode catalyst;
   a voltage conversion device that changes output voltage of the fuel cell;
   a voltage detection device that detects output voltage of the fuel cell;
   a current detection device that detects output current of the fuel cell; and
   a decision device programmed to decide whether the electrode catalyst of the fuel cell is degraded or not,
   wherein during an activation treatment on the electrode catalyst the decision device is programmed to
   (a) temporarily stop supplying oxidation gas;
   (b) make a supply amount of the reaction gas constant;
   (c) change output voltage of the fuel cell while monitoring voltage detected by the voltage detection device;
   (d) detect a cyclic voltammetry characteristic of output current of the fuel cell detected by the current detection device, the output current changing associated with change of output voltage of the fuel cell; and
   (e) decide a degradation state of the electrode catalyst of the fuel cell based on a change in a minimum point or maximum point of output current of the fuel cell in the detected cyclic voltammetry characteristic.

9. The fuel cell system according to claim 8, wherein the voltage conversion device is programmed to change output voltage of the fuel cell under a condition that the current detection device detects oxidation current as output current of the fuel cell.

10. The fuel cell system according to claim 8, wherein the voltage conversion device is programmed to change output voltage of the fuel cell under a condition that the current detection device detects reduction current as output current of the fuel cell.

11. A moving body mounting the fuel cell system according to claim 8.

* * * * *